United States Patent
Kong et al.

(10) Patent No.: US 6,287,700 B1
(45) Date of Patent: Sep. 11, 2001

(54) MULTI-LAYER FILM WITH ENHANCED LAMINATION BOND STRENGTH

(75) Inventors: Dan-Cheng Kong; Eldridge M. Mount, III, both of Fairport, NY (US)

(73) Assignee: Exxon Mobil Oil Corporation, Fairfax, VA (US)

(*) Notice: Subject to any disclaimer, the term of this patent is extended or adjusted under 35 U.S.C. 154(b) by 0 days.

(21) Appl. No.: 09/223,684

(22) Filed: Dec. 30, 1998

(51) Int. Cl.$^7$ .................................................. B32B 15/08
(52) U.S. Cl. ........................... 428/447; 428/516; 428/457
(58) Field of Search .................... 428/447, 448, 428/515, 516, 910, 457; 525/240; 526/943, 348

(56) References Cited

U.S. PATENT DOCUMENTS

| | | | |
|---|---|---|---|
| 4,692,379 | 9/1987 | Keung et al. | 428/349 |
| 4,961,992 | 10/1990 | Balloni et al. | 428/332 |
| 5,057,177 | 10/1991 | Balloni et al. | 156/244.11 |
| 5,110,671 | 5/1992 | Balloni et al. | 428/218 |
| 5,169,900 | 12/1992 | Gudelis | 525/106 |
| 5,264,277 | 11/1993 | Frognet et al. | 428/315.5 |
| 5,374,459 | * 12/1994 | Mumpower et al. | 428/36.7 |
| 5,725,962 | * 3/1998 | Bader et al. | 428/515 |
| 5,792,549 | 8/1998 | Wilkie | 428/215 |
| 5,834,007 | * 11/1998 | Babrowicz | 428/34.9 |
| 5,874,139 | * 2/1999 | Bosiers et al. | 428/25.2 |
| 5,972,443 | * 10/1999 | Breck et al. | 438/35.2 |

FOREIGN PATENT DOCUMENTS

95/21743   8/1995   (WO).

OTHER PUBLICATIONS

"A new family of linear ethylene polymers provides enhanced sealing performance", Tapi Journal, pp. 99–104, Feb. 1992.*

* cited by examiner

Primary Examiner—Paul Thibodeau
Assistant Examiner—D. Lawrence Tarazano
(74) Attorney, Agent, or Firm—T. Dean Simmons

(57) ABSTRACT

A laminated film structure that includes a primary web having a migratory additive in a first outer layer and a metallocene polyethylene in a second outer layer that can be laminated to a secondary web without treating the surface of the second outer layer with a primer or solvent. The primary web further includes a core substrate layer disposed between the two outer layers that can include a biaxially oriented polypropylene. The laminated film structures have improved bond strength between the primary web and the secondary web.

7 Claims, 1 Drawing Sheet

MULTI-LAYER FILM WITH ENHANCED LAMINATION BOND STRENGTH

BACKGROUND OF THE INVENTION

This invention relates to the field of polymer films containing migratory additives that can be laminated to other films and methods for forming such films. In particular, this invention relates to a film having a first outer layer containing a migratory additive, such as silicone oil, and a second outer layer containing a metallocene polyethylene that can be laminated to another film structure.

Multiple layer films are commonly used in the packaging industry for a variety of food products, such as potato chips, cookies, candies and other snack foods. These films can be formed by coextrusion methods or by laminating two or more films together. Many laminated films use oriented polypropylene (OPP) in the core layer because of its durability and strength. Different surface layers are selected for the interior and exterior layers of the package that are suitable for the particular product. For example, chips may have one type of inner layer, while wrapped candies may have a different type of inner layer. Similarly, the outer layer may be selected to enhance printability, clarity, gloss or other characteristics of the film. Frequently, additives are used to impart the desired characteristics to the outer layer.

The use of migratory additives to impart specific properties to the outer layers of multiple layer packaging films to improve specific film characteristics is well known in the art. These additives are often added to the thermoplastic resins before the film is extruded and only migrate to the surface (i.e., bloom) after the film is formed. When these migratory additives bloom to the surface of the outer layer, they promote the desired characteristics on the film surface. Often, the additive is a silicone oil. Silicone oils are added to an exterior layer of a film to improve its coefficient of friction in the heated state and reduce its slide resistance which occurs during hot plate seal by an automatic packaging machine. Examples of silicone oils which are useful for this purpose are olefin-modified silicone, polydimethylsiloxane, polymethylphenylsiloxane, polyether (e.g., polyethylene glycol, polypropylene glycol)-modified silicone, olefin/polyether-modified silicone, epoxy-modified silicone, etc.

The presence of a migratory additive on the surface of an exterior layer of a film can create problems when the film is used for an application that requires the opposing, untreated exterior surface of the film to be devoid of the additive. The untreated exterior surface is contacted by the additive when the film is rolled and subsequently unrolled. Rolling the film brings the treated exterior surface in contact with the untreated exterior surface and the additive is transferred. In order for the film to be used in an application that requires the untreated exterior layer to be devoid of the additive, the additive must first be removed. When the migratory additive is a silicone oil that has been added to improve the film's coefficient of friction and reduce its slide resistance, the characteristics that are desirable for the treated exterior surface are undesirable for the untreated exterior surface. Silicone oil on the untreated exterior surface is especially undesirable when the surface is to be laminated to another structure.

The key step in laminating is the creation of strong adhesive bonds between the films. To assure the formation of strong adhesive bonds, the adhesives must be compatible with the materials on the surfaces of the opposing films. While silicone oils impart useful properties to a film, film surfaces containing silicone oil have been found to have poor adherence when laminated to another film structure. In the past, this problem has been overcome by applying a primer (typically in the form of a solvent) to the film prior to lamination. In addition to the cost of the solvent, this method adds an additional step to the manufacturing process and is, therefore, more costly and undesirable. This has created a need for a film that does not require the application of a primer to neutralize silicone oil prior to lamination.

The films of the present invention find their principal utility as a structure that can be laminated to other film layers. However, it is to be understood that these films can also be used independently as a stand alone packaging material without adding additional layers.

SUMMARY OF THE INVENTION

The present invention provides a film structure made up of a primary web that includes a migratory additive in one outer layer and a metallocene polyethylene in a second outer layer that has an interior and an exterior surface. Unlike prior art films, the metallocene polyethylene outer layer can be laminated to a secondary web without having to treat the surface with a primer or solvent. The primary web film structure can also includes a core substrate layer disposed between the first outer layer and the second outer layer. The interior surface of the second outer layer is adjacent to the core substrate layer and the exterior surface is laminated to a secondary web.

The migratory additive used in the first outer layer is selected from the group made up of silicone oil, polydialkylsiloxanes, polydimethylsiloxane, polyalkylphenylsiloxanes, olefin-modified siloxane oils, polyether-modified silicone oils, olefin/polyether-modified silicone oils, epoxy-modified silicone oils, alcohol-modified silicone oils, antiblocking agents, antistatic agents, and slip agents. Preferred silicone oils have a viscosity of from about 350 to about 100,000 centistokes and the most preferred silicone oils have a viscosity of from about 10,000 to about 30,000 centistokes.

The first outer layer can also include a polyolefin selected from the group made up of homopolymers of polyethylene, polypropylene and polybutylene, and copolymers and terpolymers of polyethylene, polypropylene and polybutylene. The migratory additive in the first outer layer can be a silicone oil or the additive can be selected from the group made up of antiblocking agents, antistatic agents, and slip agents. In preferred embodiments, the first outer layer can include more than one migratory additive.

The films of the present invention can be laminated to other film structures without being pretreated prior to lamination. Specifically, the second outer layer of the primary web does not have to be treated with a primer to remove or neutralize the migratory additive from the surface.

The second outer layer includes a metallocene polyethylene that can be selected from the group made up of ethylene homopolymers, copolymers of ethylene and at least one $C_4$–$C_{20}$ alpha-olefin polymerized using single-site metallocene catalyst, wherein the alpha olefin has a molecular weight distribution (Mw/Mn) below 5.5, preferably below 3.5 and most preferably below 3.0, and a Melt Index at 190 C. and 2160 g of from 0.3 to 20 dg/min, preferably 0.8 to 10 dg/min and most preferably from 1.2 to 7 dg min. More specifically, the metallocene polyethylene can be selected from the group made up of linear low density polyethylene, very low density polyethylene, ultra low density polyethylene, polyethylene plastomers and blends thereof In addition to the metallocene polyethylene, the second outer layer can also include a polyolefin selected from the group made up of blends of 1% to 99% metallocene-based polyethylene and 99% to 1% Ziegler-Natta catalyzed ethylene homopolymers or copolymers and homopolymers and copolymers of polypropylene and polybutylene The metallocene polyethylene can include an additive selected from the group made up of 0.2 to 20 weight % high density polyethylene, 1 to 6,000 ppm spherical antiblock, 1 to 6,000 ppm random shape antiblock, antistatic agents and slip agents.

The core substrate layer includes a polyolefin selected from the group made up of oriented polypropylene, high density polyethylene, and blends of polypropylene and polyethylene.

The primary web of the film structures of the present invention can be laminated to a secondary web without pretreatment even though the laminated layer of the primary web contains a migratory additive, such as silicone oil, on the surface. Prior art film webs that contain migratory additives must be pretreated to remove the migratory additive from the surface that is to be laminated. If the migratory additive is not removed, the prior art webs will not from satisfactory bonds when laminated. In contrast, it has been found that the metallocene polyethylene copolymer outer layers in the primary web of the present invention can be laminated to a secondary film web without removing or treating the migratory additive on the surface. The laminated structures of the present invention have a bond strength between the primary web and the secondary web that is comparable to prior art that are treated with a primer prior to lamination. Consequently, the film structures of the present invention provide a savings in processing time and costs by eliminating the prelamination treatment step.

DETAILED DESCRIPTION OF THE PREFERRED EMBODIMENTS

The multiple layer films of the present invention overcome the problems encountered in prior art films that contain migratory additives by eliminating the need to treat the surface of the films with a primer prior to lamination. The present invention is based on the discovery that metallocene polyethylene film layers contacted by migratory additives, such as silicone oil, can be laminated without first being treated with a primer. It has been found that migratory additives that interfere with lamination bonding in prior art structures do not have the same effect on metallocene polyethylene film layers. The film structures of the present invention include an outer layer containing a metallocene polyethylene that provides acceptable lamination adhesion when a migratory additive is present on the surface.

For the purposes of this disclosure and, the following definitions are adopted:

Primary Web: The films of the present invention that have at least one layer containing a migratory additive and one layer containing a metallocene polyethylene.

Secondary Web: When the films of the present invention are laminated to a second film structure, the second film structure is the secondary web.

Binder: An adhesive that is used to laminate a primary web to a secondary web to form a laminated film structure. This term can be used interchangeably with the term "lamination adhesive."

Laminated Film Structure: The film that is formed by laminating the primary web to the secondary web. In addition to the primary web and the secondary web, the laminated film structure can include additional laminated film layers.

First Outer Layer or Layer (a): The outer layer of the primary web that contains a migratory additive. When the film is laminated to another film, this layer forms an outer layer of the laminated structure.

Second Outer Layer or Layer (c): The outer layer of the primary web that contains a metallocene polyethylene. When the film is laminated to another film, the lamination adhesive contacts this layer. This layer forms an inner layer of the laminated structure.

Core Layer or Layer (b): The layer disposed between the First Outer Layer and the Second Surface Layer of the primary web. In some embodiments of the present invention, there can be intervening layers between the Core Layer and the two outer layers.

The primary web of the film structures of the present invention has at least two layers.

Figure 1:
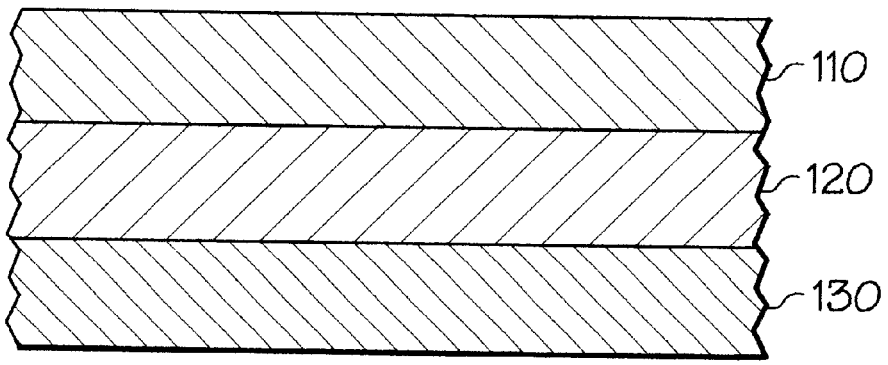
FIG. 1 is a cross-section of a three layer primary web of the present invention.

The first layer contains a migratory additive and the second layer contains a metallocene polyethylene. FIG. 1 illustrates a preferred embodiment in which the primary web 100 has three layers including a core layer 120 containing an oriented polypropylene and a first outer layer 110 and a second outer layer 130. The primary web 100 shown in FIG. 1 can be used for packaging food products or it can be laminated to another film structure.

Figure 2:
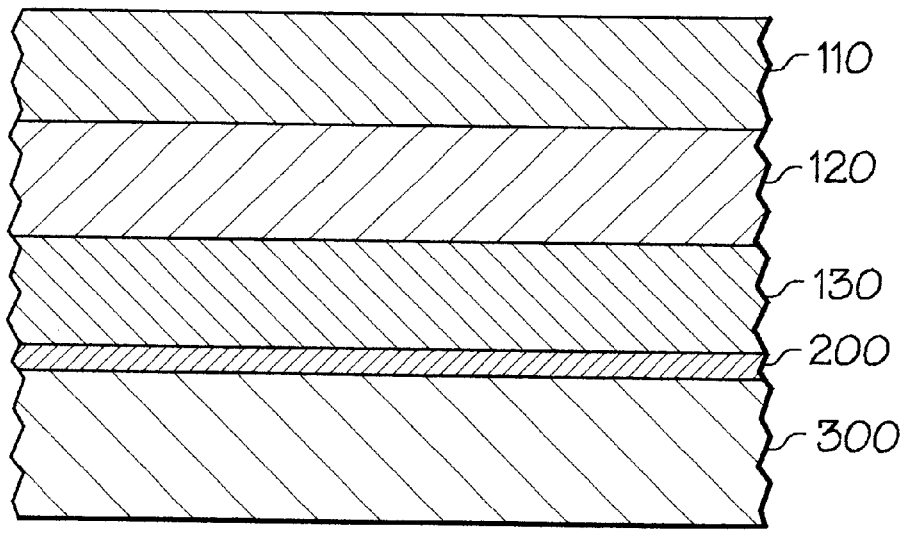
FIG. 2 is a cross-section of a laminated film structure of the present invention that includes a primary web laminated to a secondary web.

As illustrated in FIG. 2, the primary web 100 can be laminated to a secondary web 300 using a binder 200 to form a laminated film structure 10. When the films are laminated, the metallocene polyethylene layer 130 of the primary web 100 is bonded to the secondary web 300. Unlike prior art films that contained migratory additives, the primary web 100 of the films of the present invention do not have to be treated with a primer before they can be laminated. It has been found that the metallocene polyethylene copolymers in the second outer layer 130 are not effected by the migratory additives in the same way as the polymers used in prior art films. Migratory additives, such as silicone oils, can be present on the surface of the outer layer 130 and the primary web 100 can be successfully laminated to a secondary web 300. When compared to prior art films, the laminated film structures 10 of the present invention have superior bond strength between the primary web 100 and the secondary web 300.

The first outer layer (a) 110 of the primary web 100 is includes a polyolefin selected from the group made up of homopolymers of polyethylene, polypropylene and polybutylene, and copolymers and terpolymers of polyethylene, polypropylene and polybutylene. Preferred polyolefins are an ethylene-propylene-butene-1 (EPB) terpolymer, an ethylene-propylene (EP) random copolymer or a blend thereof Suitable EPB terpolymers are those obtained from the random interpolymerization of from about 1 to about 8 weight percent ethylene, preferably from about 3 to about 6 weight percent ethylene with from about 65 to about 95 weight percent propylene, preferably from about 86 to about 93 weight percent propylene, butene-1 representing the balance. The EPB terpolymers are for the most part characterized by a melt index at 230 C. of from about 2 to about 16 and advantageously from about 3 to about 7, a crystalline melting point of from about 100 C. to about 120 C., an average molecular weight of from about 25,000 to about 100,000 and a density within the range of from about 0.89 to about 0.92 gm/cm³.

The EP random copolymers contain from about 2 to about 7 weight percent ethylene, the balance being made up of propylene. The copolymers can have a melt index at 230 C. ranging from about 2 to about 15 and preferably from about 3 to about 8. The crystalline melting point is from about 125 C. to about 150 C. and the number average molecular weight range is from about 25,000 to 100,000. The density range is from about 0.89 to about 0.92 gm/cm³. In general, where blends of EPB terpolymer and EP random copolymer are used, the blends contain from about 10 to about 90 weight percent EPB terpolymer and preferably from about 40 to about 60 weight percent EPB terpolymer, the balance being made up of EP random copolymer.

The outer layer (a) 110 includes a migratory additive which is selected from the group made up of silicone oil, polydialkylsiloxanes, polydimethylsiloxane, polyalkylphenylsiloxanes, olefin-modified siloxane oils, polyether-modified silicone oils, olefin/polyether-modified silicone oils, epoxy-modified silicone oils, alcohol-modified silicone oils, antiblocking agents, antistatic agents, and slip agents.

In a preferred embodiment, the polymer constituting outer layer (a) 110 is compounded with a silicone oil. The silicone oil typically possesses a viscosity of from about 350 to 100,000 centistokes with from about 10,000 to 30,000 centistokes being especially preferred. Examples of suitable silicone oils are polydialkylsiloxanes, polyalkylphenylsiloxanes, olefin-modified siloxane oils, polydimethylsiloxanes, polyether-modified silicone oils, olefin/polyether-modified silicone oils, epoxy-modified silicone oils and alcohol-modified silicone oils. In particular, polydialkylsiloxanes having from about 1 to about 4 carbon atoms in the alkyl group, in particular polydimethylsiloxane, are preferred.

The silicone oil can be added to outer layer (a) 110 in the form of a dispersion or emulsion, the silicone being present within and on the exposed surface of this layer as discrete microglobules, frequently of an average size of from about 1 to about 2 microns. The silicone oil is substantially uniformly distributed on the exposed surface of outer layer (a) and is responsible for imparting a reduced coefficient of friction to this surface. Silicone oil is transferred from the exposed surface of outer layer (a) 110 to the exposed surface of outer layer (c) 130 when the surfaces have been placed in mutual contact, e.g., as will occur when the primary web 100 is wound on a winding coil.

Polydimethylsiloxane or other silicone oil can be present in an amount of from about 0.15 to about 1.5 weight percent of the first outer layer (a) 110. Some of the silicone oil can also be present on the exposed surface of outer layer (c) 130. The amount of silicone oil in outer layer (a) 110 should be sufficient to provide a coefficient of friction for outer layer (a) 110 (following transfer of some of the silicone oil microglobules to outer layer (c) 130) of about 0.4 or less, preferably between about 0.25 to about 0.3 up to about 60 C.

The silicone oil should be incorporated as homogeneously as possible in the polymer constituting outer layer (a) 110. This can be achieved by either incorporating the silicone oil as a dispersion or emulsion at room temperature and then heating the blend with the application of shearing forces or by incorporating the oil while the blend is being melted. The mixing temperature must be high enough to soften the blend and enable a very uniform mixture to be formed. The temperature required in a kneader or extruder is generally from about 170 C. to about 270 C.

In order to enhance its receptivity for water-based coatings, outer layer (a) 110 can be treated by such known and conventional techniques as corona discharge and flame treating.

Core layer (b) 120 of the primary web 100 includes a polyolefin selected from the group made up of oriented polypropylene, high density polyethylene, and blends of polypropylene and polyethylene. Preferably core layer (b) 120 contains a polypropylene of high stereoregularity that can be chosen from among the highly isotactic polypropylenes. The preferred polypropylenes are well known in the art and are formed by polymerizing polypropylene in the presence of stereospecific catalyst systems. The polypropylenes can have a melt index at 230 C. ranging from about 1.0 to about 25.0. The crystalline melting point is about 160 C. The number average molecular weight ranges from about 25,000–100,000 and the density ranges from about 0.90 to 0.91.

Second outer layer (c) 130 of the primary web includes a metallocene polyethylene that can be selected from the group made up of ethylene homopolymers, copolymers of ethylene and at least one $C_4$–$C_{20}$ alpha-olefin polymerized using single-site metallocene catalyst, wherein the alpha olefin has a molecular weight distribution (Mw/Mn) below 5.5, preferably below 3.5 and most preferably below 3.0, and a Melt Index at 190 C. and 2160 g of from 0.3 to 20 dg/min, preferably 0.8 to 10 dg/min and most preferably from 1.2 to 7 dg min. More specifically, the metallocene polyethylene can be either linear low density polyethylene, very low density polyethylene, ultra low density polyethylene, polyethylene plastomers or blends thereof In addition to the metallocene polyethylene, the second outer layer (c) 130 can include blends of 1% to 99% metallocene-based polyethylene and 99% to 1% Ziegler-Natta catalyzed ethylene homopolymers or copolymers and homopolymers and copolymers of polypropylene and polybutylene The metallocene polyethylene can include an additive selected from the group made up of 0.2 to 20 weight % high density polyethylene, 1 to 6,000 ppm spherical antiblock, 1 to 6,000 ppm random shape antiblock, antistatic agents and slip agents.

The metallocene polyethylene is a polyethylene formed using single-site metallocene catalyst technology. More specifically, a polyethylene formed using well known single-site metallocene catalyst technology, such as disclosed in U.S. Pat. No. 5,324,800, and having a density range of about 0.890 to 0.945 g/cc, and a peak melting point range of about 185 F. to 255 F. Preferably, the second outer layer (c) 130 is a very-low-density polyethylene having a density of about 0.910 g/cc and a peak melting point of about 226 F. A preferred very low density polyethylene is sold by Dow Plastics, Dow U.S.A., Midland, Mich., under the trademark AFFINITY, especially the AFFINITY PL 1845 copolymer.

The metallocene polyethylene can also be an ultra low density polyethylene plastomer having a density of about 0.865 to 0.889 g/cc and a peak melting point range of about 120 F. to 185 F. Polyethylene plastomers are formed using well known single-site metallocene catalyst technology, which permits very precise control of comonomer which may be incorporated into the polyethylene polymer and of molecular weight distribution. The plastomers are homopolymers of ethylene, or copolymers of ethylene with higher alpha-olefins having from 3 to about 10 carbon atoms such as 1-butene, 1-hexene and 1-octene. The plastomers are commercially available from Dow Plastics, Dow U.S.A., Midland, Mich., under the trademark ENGAGE, especially ENGAGE EG8100 (an ethylene/1-octene copolymer). The ENGAGE plastomers have a density range of about 0.865 to 0.889 g/cc and a peak melting point range of about 120 F. to 185 F. Suitable plastomers also are available from Exxon Chemical Americas, Polymer Group, under the trademark EXACT. The EXACT plastomers have similar density and peak melting point ranges as defined for the Dow plastomers.

The primary web 100 of the present invention can have various combinations of layers. Core layer (b) 120 of the primary web 100 can make up from about 70 to about 90 percent of the thickness of the overall film, or in some embodiments an even higher percentage thereof. First outer layer (a) 110 and second outer layer (c) 130 are coextensively applied to each major surface of core layer (b) 120, preferably as a coextrusion. For example, the individual polymer streams constituting the materials of layers (a) 110, (b) 120 and (c) 130 can be coextruded from a conventional extruder through a flat sheet die, the melt streams being combined in an adapter prior to being extruded from the die. Each of outer layers (a) 110 and (c) 130 can make up, for example, approximately 6.0% of the total thickness of the primary web 100. After leaving the die orifice, the coextruded primary web is chilled and the quenched sheet is then heated and stretched, e.g., five times in the machine direction (MD) and eight times in the transverse direction (TD). Table 1 below lists several preferred structures for the primary web 100.

TABLE 1

THREE LAYER FILM STRUCTURES (PRIMARY WEB)

| Film No. | First Outer Layer Layer (a) | Core Layer Layer (b) | Second Outer Layer Layer (c) |
|---|---|---|---|
| 1 | EPB Terpolymer | Polypropylene | Dow Affinity PL 1840 |
| 2 | EPB Terpolymer | Polypropylene | Dow Affinity PL 1845 |
| 3 | EPB Terpolymer | Polypropylene | Dow Affinity PL 1850 |
| 4 | EPB Terpolymer | Polypropylene | Mobil ZCE 200 |
| 5 | EPB Terpolymer | Polypropylene | Exxon Exact 3034 |

Where:
EPB Terpolymer: Ethylene-Propylene-Butene Terpolymer compounded with 24,000 ppm silicone oil (Chisso 7502, 7702 or 7820)
Polypropylene: Fina 3371
Dow Affinity PL 1840: Metallocene Polyethylene, density= 0.909 g/cc
Dow Affinity PL 1845: Metallocene Polyethylene, density= 0.910 g/cc
Dow Affinity PL 1850: Metallocene Polyethylene, density= 0.902 g/cc
Mobil ZCE 200: Metallocene Polyethylene, density= 0.918 g/cc The primary web 100 is preferably used as a laminate layer of a laminated film structure 10. The primary web 100 can be laminated to a variety of different film structures that can include paper, thermoplastic, metallized and foil layers. Table 2 lists preferred embodiments of the laminated film structures 10 of the present invention. The laminated film structures 10 shown in Table 2 include a primary web 100 laminated to a secondary web 300 using a binder 200.

A binder 200 is used in the lamination process to adhere the primary web 100 to the secondary web 300. The binder 200 can be applied by well known coating methods or it can be applied as an extrusion. In a preferred embodiment of the present invention, the binder 200 is extruded onto one of the webs and the primary web 100 and secondary web 300 are immediately pressed together using rollers to bond their surfaces together. The binder 200 can be a thermoplastic adhesive, such as plasticized vinyl acetate/vinyl chloride copolymers or the binder 200 can be an emulsion of acrylics. The binder 200 can also be an extruded adhesive, such as polyethylene and ethylene copolymers. Low density polyethylenes are preferred extrusion adhesives.

TABLE 2

LAMINATE FILM STRUCTURES

| Film No. | Three Layer Film Structure (Primary Web) | Binder (Adhesive) | Second Film (Secondary Web) |
|---|---|---|---|
| 6 | Film No. 1 | PE | VM-PP |
| 7 | Film No. 3 | PE | VM-PP |
| 8 | Film No. 5 | PE | VM-PP |
| 9 | Film No. 3 | PE | PVDC coated OPP |

Where: PE: Chevron 1017 polyethylene
VM-PP: Vacuum metallized polypropylene film (Mobil 70 Met-HB or Himac VM-CPP2500)
PVDC coated OPP: Polyvinylidene chloride coated oriented polypropylene film

EXAMPLE 1

Table 3 lists twelve laminated film structures that were tested for primary bond strength between the primary web and the secondary web. The films in test runs 1 to 10 were fabricated in accordance with the present invention and the primary web of these films included a second outer layer containing a metallocene polyethylene. The films in test runs 11 and 12 were used as control films and the second outer layers of these films did not include a metallocene polyethylene. After the laminated film sturctures were fabricated, they were tested for primary bond strength.

Primary bond strength was measured by cutting a one inch wide strip from the laminate structures and peeling the primary web and the secondary web apart at 12 inches/min. and 180 degrees peel angle on an Instron tensile tester. The average peel force measured by the test is listed in Table as the primary bond strength.

TABLE 3

PRIMARY BOND STRENGTH BETWEEN PRIMARY WEB AND BINDER

| Test No. | Primary Web | Binder | Secondary Web | Primary Bond (g/in) |
|---|---|---|---|---|
| 1 | EPB-Chisso 7820/Fina 3371/Mobil ZCE 200 | LDPE* | Mobil ZCE 200/Fina 3371/Chisso 7820 | >200 (PE tear) |
| 2 | EPB-Chisso 7820/Fina 3371/Mobil ZCE 200 | LDPE | PVDC coating/BOPP | >200 (PE tear) |
| 3 | EPB-Chisso 7820/Fina 3371/Mobil ZCE 200 | LDPE | BOPP/PVDC coating | 242 |
| 4 | EPB-Chisso 7820/Fina 3371/Affinity PL 1840 | LDPE | Affinity PL 1840/Fina 3371/Chisso 7820 | 528 |
| 5 | EPB-Chisso 7502/Fina 3371/Affinity PL 1840 | LDPE | Aluminum Vacuum Metallization/BOPP | 227 |
| 6 | EPB-Chisso 7502/Fina 3371/Mobil ZCE 200 | LDPE | Aluminum Vacuum Metallization/BOPP | 247 |
| 7 | EPB-Chisso 7502/Fina 3371/Mobil ZCE 200 | LDPE | Affinity PL 1840/Dowlex 2045A/Affinity PL 1840 | 482 |
| 8 | EPB-Chisso 7502/Fina 3371/Affinity PL 1840 | PU** | Affinity PL 1840/Dowlex 2045A/Affinity PL 1840 | >500 |
| 9 | EPB-Chisso 7502/Fina 3371/Affinity PL 1850 | LDPE | Aluminum Vacuum Metallization/BOPP | 230 |
| 10 | EPB-Chisso 7502/Fina 3371/Exxon Exact 3034 | LDPE | Aluminum Vacuum Metallization/BOPP | 216 |
| 11 | Control--EPB-Chisso 7502/Fina 3371/EPB-Chisso 7510 | LDPE | Aluminum Vacuum Metallization/BOPP | 60 |
| 12 | Control--EPB-Chisso 7502/Fina 3371/Fina 3371 | LDPE | Aluminum Vacuum Metallization/BOPP | 10 |

*LDPE: Extrusion lamination grade Low Density Polyethylene
**PU: Polyurethane Solution Adhesive The test results in Table 3 show that the films of the present invention with a metallocene polyethylene in the second outer layer of the primary web had higher primary bond strengths than the control films that did not have a metallocene polyethylene in the second outer layer.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

What is claimed is:

1. A coextruded film structure comprising:
   (a) a first outer layer comprising a migratory additive;
   (b) a second outer layer comprising single site catalyzed ethylene homopolymers or copolymers and having an interior surface and an exterior surface, wherein the exterior surface is contacted by the migratory additive of the first outer layer upon the winding of the film structure; and
   (c) a core substrate layer, wherein said core substrate layer is disposed between said first outer layer and said second outer layer, and further wherein said interior surface of said second outer layer is adjacent to said core substrate layer, wherein said core substrate layer comprises a polyolefin selected from the group consisting of polypropylene, high density polyethylene, and mixtures thereof, and said film structure is laminated to a metallized sealable film by coating the exterior surface of the second outer layer of said film structure with adhesive and bonding the second outer layer of said film structure to a metallized surface of the metallized sealable film, and further wherein the lamination bond strength between said film structure and the metallized sealable film is greater than 100 g/in.

2. The film structure of claim 1, wherein said migratory additive is a silicone oil selected from the group consisting of polydialkylsiloxanes, polydimethylsiloxane, polyalkylphenylsiloxanes, olefin-modified siloxane oils, polyether-modified silicone oils, olefin/polyether-modified silicone oils, epoxy-modified silicone oils, and alcohol-modified silicone oils.

3. The film structure of claim 1, wherein said migratory additive is a silicone oil having a viscosity of from about 350 to about 100,000 centistokes.

4. The film structure of claim 1, wherein said migratory additive is a silicone oil having a viscosity of from about 10,000 to about 30,000 centistokes.

5. The film structure of claim 1, wherein said first outer layer further comprises a polyolefin selected from the group consisting of homopolymers, copolymers, and terpolymers of polypropylene.

6. The film structure of claim 1, wherein said first outer layer is treated by corona discharge or flame treatment.

7. The film structure of claim 1, wherein said single site catalyzed polyethylene has a density from 0.865 g/cm$^3$ to 0.945 g/cm$^3$.

* * * * *